(No Model.)
D. R. PRUDEN.
EYEGLASS OR SPECTACLE CASE.
No. 467,707. Patented Jan. 26, 1892.
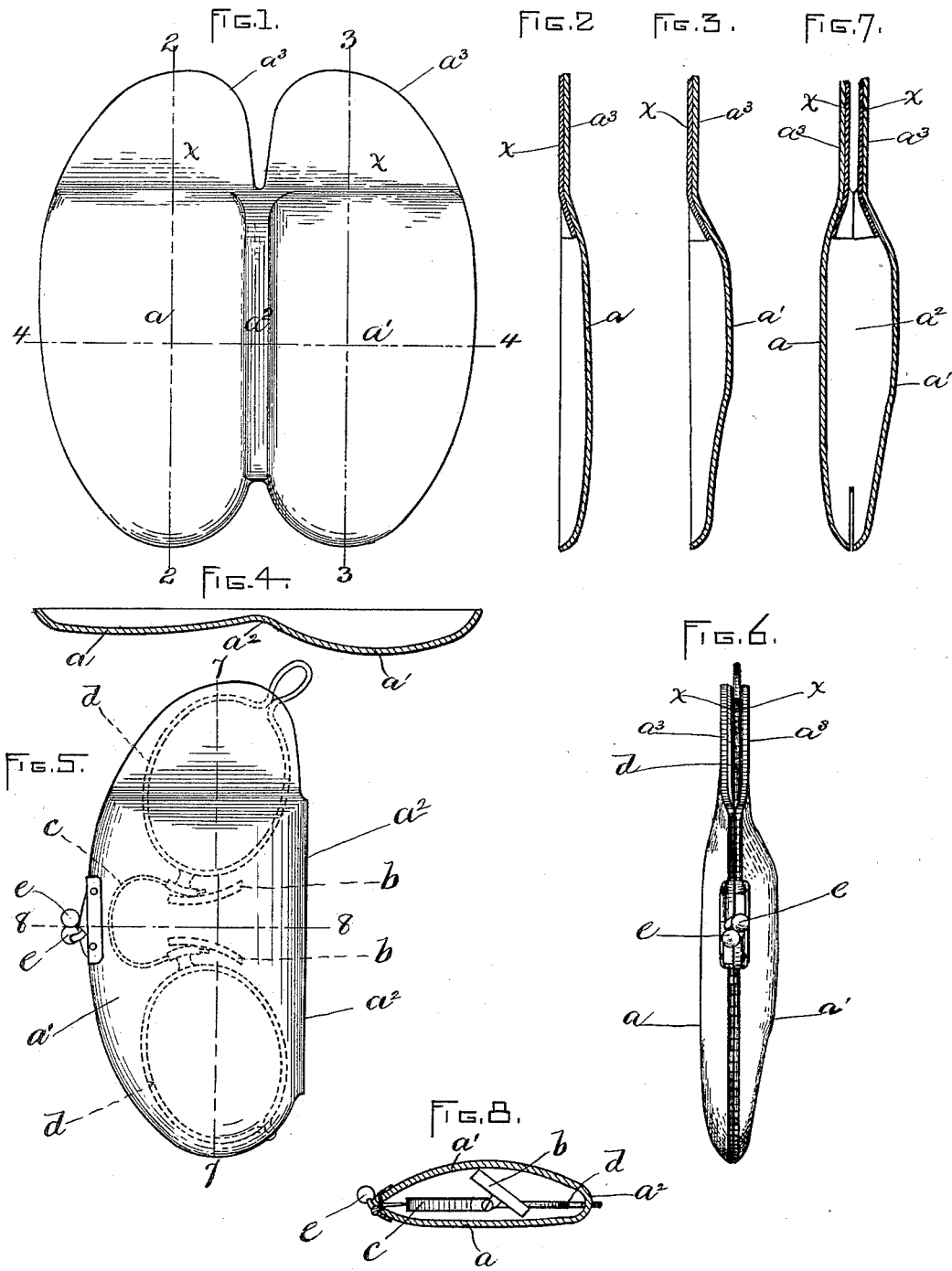
WITNESSES:
INVENTOR:

UNITED STATES PATENT OFFICE.

DANIEL R. PRUDEN, OF CHELSEA, MASSACHUSETTS.

EYEGLASS OR SPECTACLE CASE.

SPECIFICATION forming part of Letters Patent No. 467,707, dated January 26, 1892.

Application filed October 29, 1891. Serial No. 410,245. (No model.)

*To all whom it may concern:*

Be it known that I, DANIEL R. PRUDEN, of Chelsea, in the county of Suffolk and State of Massachusetts, have invented certain new and useful Improvements in Eyeglass or Spectacle Holders, of which the following is a specification.

This invention has for its object to provide a simple and inexpensive holder for eyeglasses and spectacles, adapted to protect the glasses from injury.

The invention also has for its object to enable an eyeglass or spectacle holder to be utilized as a wiper or cleaner for the glasses.

To these ends the invention consists in the improvements which I will now proceed to describe and claim.

In the accompanying drawings, forming part of this specification, Figure 1 represents a plan view of the sheet or blank from which an eyeglass-holder embodying my invention is made. Fig. 2 represents a section on line 2 2, Fig. 1. Fig. 3 represents a section on line 3 3, Fig. 1. Fig. 4 represents a section on line 4 4, Fig. 1. Fig. 5 represents a side view of the completed holder made from the blank shown in the previously-mentioned figures. Fig. 6 represents an edge view of the same. Fig. 7 represents a section on line 7 7, Fig. 5. Fig. 8 represents a section on line 8 8, Fig. 5.

The same letters of reference indicate the same parts in all the figures.

In carrying out my invention I take a flat sheet or piece of any suitable strong and stiff material having the characteristics hereinafter set forth, and by means of suitable dies cut from the said sheet a blank, which comprises two covers $a$ $a'$ and a connecting-neck $a^2$, integral with said covers. The form of the blank will depend upon the construction of the glasses or spectacles which the holder made therefrom is to contain, the blank shown in Fig. 1 being intended for eyeglasses of substantially the construction shown by dotted lines in Fig. 5. The covers $a$ $a'$ are subjected to a molding pressure between suitable dies adapted to dish each cover, so that one of its sides will be concave or recessed and its opposite side convex or crowning. In the present instance I give the covers such form as to adapt them to eyeglasses having the diagonally-arranged nose-pieces $b$ $b$, secured to the bow $c$, that connects the frames $d$ $d$ of the glasses; and to this end I make the cover $a'$ considerably deeper than the cover $a$ to accommodate the greater projection of the nosepiece $b$ from one side of the plane of the glasses than from the other side, as shown in Fig. 8. It is obvious, however, that for holding glasses which are not provided with the diagonally-arranged nose-pieces the depth of each cover may be practically the same, my invention not being limited to the variation here shown between the two covers.

Each of the covers $a$ $a'$ is provided at one end with a flat pad $a^3$, these pads being provided with linings $x$ $x$, of chamois-skin or other suitably soft material. The pads $a^3$ are formed so that when the covers $a$ $a'$ are brought into operative relation with each other, as hereinafter described, the linings $x$ $x$ of the pads will be in position to bear simultaneously upon opposite sides of one of the glasses, so as to clean the surfaces of the glass, the pads being substantially parallel with each other and capable of being pressed toward each other to press the linings $x$ $x$ with any desired degree of force against the surfaces of the glass.

In converting the blank above described into a holder I bend the neck $a^2$ so as to bring the covers $a$ $a'$ opposite each other and cause their outer edges to coincide, as shown in Figs. 5, 6, and 8. The free edges of the covers $a$ $a'$ are provided with suitable clasps or fastening members, whereby the holder may be closed and caused to retain an eyeglass.

I have shown in Figs. 5 and 6 a well-known form of clasp consisting of two shanks, one attached to one cover and the other to the other cover, said shanks having on their outer ends spherical heads $e$ $e$, arranged to co-operate as in a well-known porte-monnaie fastening. I do not limit myself to this fastening device, however, and may use any other suitable fastening.

The material of which the covers $a$ $a'$ and neck $a^2$ are formed should be sufficiently stiff and rigid to prevent injury to the glasses held between the covers by external pressure, and at the same time sufficiently elastic to enable the neck $a^2$ to spring sufficiently to permit the opening and closing of the covers to the extent required to release and confine the glasses, the neck being preferably adapted to slightly open or separate the covers when the clasp that connects them is released, so that the glasses can be conveniently removed and replaced. I prefer as the material for the holder some of the well-known fibrous materials, such as vulcanized fiber or compressed pulp, the same being suitably hardened by compression. If desired, however, the holder may be made of sheet metal. In fact I do not limit myself to any particular material in the construction of the holder, but may use any suitable material or combinations of materials which will permit the described formation and operation of the holder.

I prefer to cover the external surface of the covers $a$ $a'$ and neck $a^2$ with a sheet of leather or other suitable material adapted to give the desired finish to the holder, the said material being pasted or cemented to the sheet from which the body of the holder is formed before the operations of trimming and molding the holder, the said covering practically forming an integral part of the holder.

It will be observed that the flat pads $a^3$ $a^3$ at one end of the holder, provided with soft linings, greatly increase the convenience of the holder by enabling it to be utilized in wiping or cleaning the glasses.

I claim—

1. An eyeglass or spectacle holder composed of two dished covers of stiff material and a connecting-neck integral with said covers, as set forth.

2. An eyeglass-holder composed of two covers and a connecting-neck integral with the covers, all formed from a piece of stiff material, said covers having glass-cleaning pads at one end of the holder, as set forth.

3. An eyeglass-holder composed of two dished covers and a connecting-neck integral therewith, one of the covers being more deeply hollowed or dished than the other, as and for the purpose specified.

4. As an improved article of manufacture, an eyeglass or spectacle holder composed of a piece of stiff material cut to form two covers and a connecting-neck integral with the covers and pressed or molded to dish or concave each cover, the connecting-neck being bent to bring the covers together, said neck constituting an elastic connection between the covers, whereby they are permitted to open or close sufficiently to release or confine the article held by the holder, as set forth.

In testimony whereof I have signed my name to this specification, in the presence of two subscribing witnesses, this 23d day of October, A. D. 1891.

DANIEL R. PRUDEN.

Witnesses:
C. F. BROWN,
A. D. HARRISON.